Figure 1:
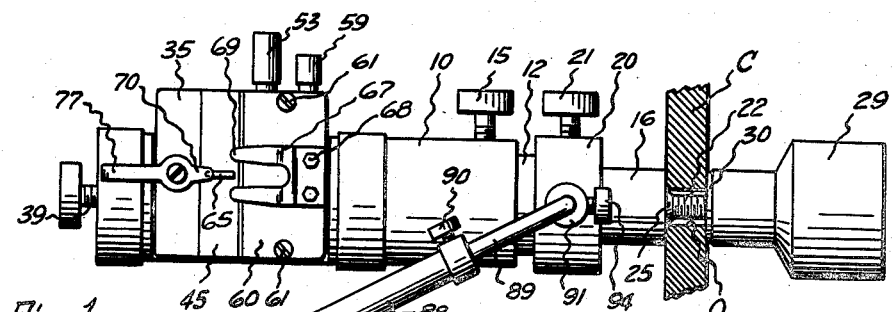

Oct. 10, 1950

H. C. FOX 2,525,027

TYPE GAUGE AND SOLDERING JIG

Filed May 29, 1947

HAROLD C. FOX
INVENTOR.

BY

ATTORNEY

Patented Oct. 10, 1950

2,525,027

UNITED STATES PATENT OFFICE 2,525,027

TYPE GAUGE AND SOLDERING JIG

Harold C. Fox, Dallas, Tex.

Application May 29, 1947, Serial No. 751,382

15 Claims. (Cl. 113—99)

This invention relates to new and useful improvements in type gages and soldering jigs, particularly adapted for correctly determining the position of type to be set in a typewriting machine and for holding the type blocks in place while they are soldered to the type bars.

When replacing worn type blocks or changing the characters of the type blocks of a typewriting machine or the like, it is important that the type blocks be rigidly so positioned on the type bars as to print in proper alignment and effect a full uniform impression. Therefore, the type block must be set on the type bar at an exact distance or radius from the pivot upon which the bar swings, and the block must also be set on the bar as such an angle as to cause the type to strike flatly against the platen. Methods and devices heretofore employed for this purpose have not only been unwieldly and involved manipulation of such a character that accuracy in setting of the type block has been extremely difficult, but such devices have heretofore generally been designed for use with only one particular type and model of machine. Thus, a service institution engaged in replacing and retyping machines of the character mentioned has been required to purchase and keep at hand a large variety of devices to permit servicing the several makes, styles, sizes and types of machines. Furthermore, the devices heretofore used have frequently been bulky and cumbersome and required a substantial disassembly of the typing machine to effect replacement or installation of new type blocks thereon.

It is, therefore, one object of this invention to provide an improved type gage and soldering jig for definitely and positively positioning the type block in proper printing position with respect to the platen, said device being arranged to hold the type block in such correct position during the operation of soldering the block to the type bar.

An important object of the invention is to provide a type gage and soldering jig, of the character described, which is adapted for use with various types and sizes of typewriting machines and which is provided with means for positively adjusting and locating the type block table or platform for correctly positioning and holding the type blocks while the same are soldered to the type bars; such gage also being adapted for use in holding and positioning the type of machines in which the type bars are adjustably mounted on their pivot shaft, whereby the type may be aligned without resetting the type blocks on the type bars.

A further object of the invention is to provide a device of the character described which is adapted to be rigidly clamped and supported in correct position by means of a shaft extending through one of the platen shaft journal openings of the typewriter carriage, whereby the type is fitted to the particular machine being serviced.

Another object of the invention is to provide in a device of the character described means for positively and resiliently holding the type bar in place in the notch or slot at the back of the type block while the block is soldered to the bar.

Still another object of the invention is to provide in a type gage and soldering jig of the character described a type positioning lug on the type platform or table, which lug may be adjusted in position longitudinally and radially of the axis of the platen shaft and tangentially of the platen surface, whereby the type may be positively accurately aligned and positioned for correct striking on the platen.

A still further object of the invention is to provide in a type gage and soldering jig of the character described a movable table or type platform having means for positively adjusting it in position and means for locking the platform or table in the proper adjusted position.

Still another object of the invention is to provide in a type gage and soldering jig of the character described means providing for positively setting the table or type platform at the correct platen diameter.

A further particular object of the invention is to provide a type gage and soldering jig having means for positively holding the type block in position on the type table or platform, whereby the type may be more readily accurately secured to the type bar; said means for holding the type being also adjustable to permit accurate vertical aligning of the type block.

Still another object of the invention is to provide a type gage and soldering jig of the character described which is small and easily installed and used and which does not require complete or substantial dismantling of the typewriter to permit replacement of used type or installation of new type blocks thereon.

Figure 2:
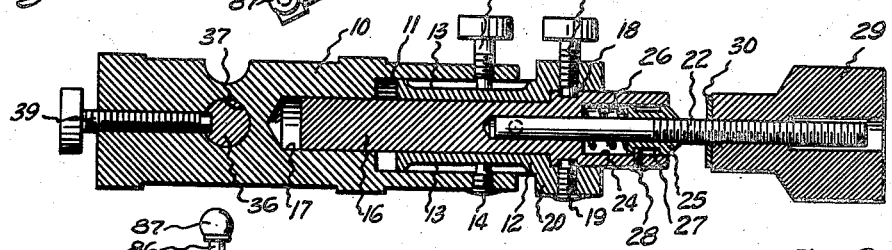
Figure 3:
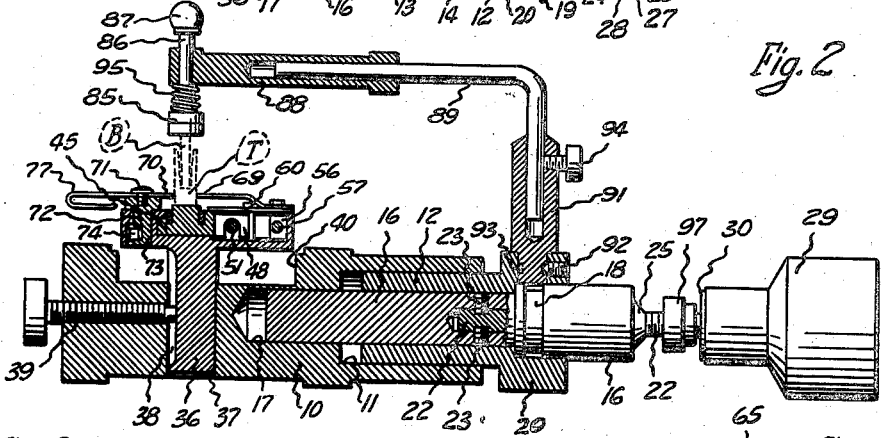
Figure 5:
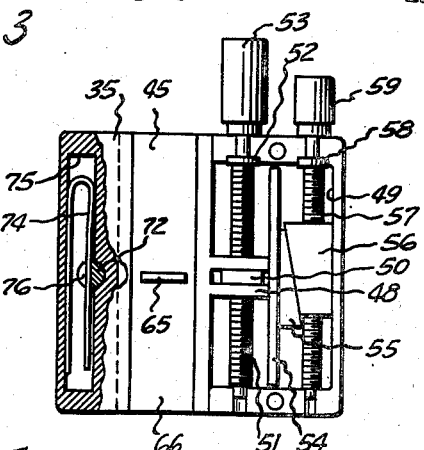
Figure 4:
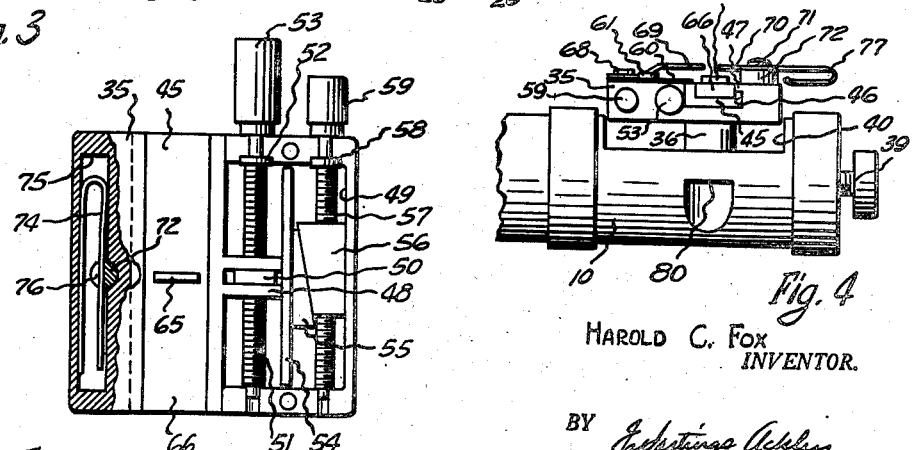

Additional objects and advantages of the invention will readily be apparent from the reading of the following description of a device constructed in accordance with the invention, and reference to the accompanying drawings thereof, wherein:

Figure 1 is a top plan view of a type gage and soldering jig embodying the invention, Figure 2 is a longitudinal vertical sectional view of the device of Figure 1, Figure 3 is a longitudinal vertical sectional view taken at right angles to the view of Figure 2, Figure 4 is a fragmentary view, in elevation, of the back of the device of Figure 1, illustrating the means by which the type table or platform may be positioned at correct platen diameter, and Figure 5 is an enlarged view, partly in elevation and partly in section, of the type table or platform showing the means for positively moving and locking the same.

In the drawings, the numeral 10 designates an elongate substantially cylindrical body having an axial bore 11 formed in one end thereof. An elongate cylindrical tubular sleeve 12 is slidably mounted in the bore 11 of the body and is adapted to move longitudinally inwardly and outwardly therein. The sleeve is provided with opposed key slots 13, and a restraining screw 14, having its inner end projecting into one of the key slots 13, is threaded through the wall of the body 10 for retaining the sleeve in the bore of the body and guiding its longitudinal movement therein. A thumb screw 15 is threaded through the wall of the body opposite the retaining screw 14 and has a tip adapted to engage in the other key slot 13 for locking the sleeve against longitudinal and rotative movement in the bore of the body. By loosening the thumb screw 15 the sleeve may be adjusted longitudinally inwardly and outwardly of the bore of the body and then locked in a desired adjusted position by tightening said thumb screw.

An arbor member 16 is rotatably mounted in the bore of the sleeve 12 and extends therethrough into a reduced portion 17 of the bore of the body. The outer end portion of the arbor is enlarged in diameter and fits in an enlargement in the bore of the sleeve 12, whereby the arbor is limited in its inward movement into the sleeve. An external annular groove 18 is formed in the periphery of the enlarged portion of the arbor and a retaining screw 19 is threaded through the wall of an enlarged flange portion 20 on the outer end of the sleeve and has its tip engaging in the annular groove 18 to retain the arbor in position in the sleeve. A set screw 21 is also threaded through the wall of the flange portion of the sleeve and likewise engages in the annular groove 18 of the arbor member, whereby the screw may be tightened to lock the arbor member against rotation about its axis in the sleeve.

An elongate cylindrical clamping shaft or screw 22 has one end secured by set screws 23 in an axial opening formed in the outer end of the arbor 16 and projects axially outwardly beyond the outer end of said arbor. The outer end of the arbor is provided with an enlarged axial bore 24, and a centering member 25 surrounds the clamping shaft 22 and is slidable longitudinally on said shaft in the bore 24 of the arbor. A spring 26 is confined between the inner end of the centering member and the inner end of the bore 24 in the arbor and acts to urge the centering member outwardly from within such bore. An elongate annular groove 27 is former in the cylindrical surface of the centering member, and a retaining screw 28 threaded through the wall of the outer end of the arbor engages in such groove and prevents displacement of the centering member outwardly from within the bore of the arbor. Due to the length of the groove 27, however, the centering member may undergo a limited longitudinal movement in the bore 24.

The outer end of the centering member is substantially conical in shape, whereby the shaft 22 may be centered in the platen shaft bearing opening O of the carriage frame C of a typewriting machine. The shaft extends completely through said opening and a clamping nut 29 is threaded onto its outer end for drawing the end of the arbor 16 against the carriage frame upright C, whereby the body 10 and its associated parts are rigidly and securely held in position on the carriage with their axis extending along the line of the axes of the platen shaft bearing openings of the typewriting machine. If desired, a washer 30 may be interposed between the clamping nut and the carriage C of the typewriter to reduce friction as the clamping nut is tightened.

A type supporting table or platform 35, preferably substantially rectangular in configuration, has a depending shank 36 located substantially centrally of its underside, and said shank extends through a diametrical opening 37 formed in the body 10. The shank has a key slot 38 formed longitudinally thereof, and an elongate locking screw 39 is screw-threaded axially into the end of the body 10 and extends into the diametrical opening 37. The end of the locking screw 39 engages in the key slot 38 for guiding the type supporting table or platform in its radial movement with respect to the body 10, and said locking screw is adapted to be tightened to secure the platform at any desired adjusted position.

The portion of the body 10 underlying the platform 35 is cut away to provide a recess 40 into which the platform may be moved to bring the upper surface of said platform into tangential alignment with the outer periphery of the cylindrical portion of the body. This provides for adjustment of the platform to a minimum platen diameter, but permits the platform to be moved radially outwardly of the axis of the body to a position which would be tangential to platens of larger diameters.

An adjustable type-supporting plate 45 is slidable longitudinally in a groove 46 formed in the upper surface of the platform 35. One upper longitudinal edge of the plate is cut away and engages under an inwardly projecting flange 47 carried by said platform, whereby the plate is retained and guided in its longitudinal movement in said groove. The plate 45 is provided with a laterally extending bifurcated arm 48 located substantially centrally of said plate, and this arm extends into a large recess 49 formed in the table or platform 35, as clearly shown in Figure 5. The bifurcated sections of the arm engage on either side of a square nut 50 which is threaded onto an elongate adjusting screw 51 extending through said recess parallel to the movable supporting plate. Obviously, the adjusting screw may be threaded directly through the arm, if desired, in which case the square nut could be omitted. The adjusting screw is provided with an external annular retaining flange 52 spaced inwardly from the head 53 of said screw and adapted to engage against the upper wall of the recess in said platform to prevent longitudinal movement of the adjusting screw. Rotation of the adjusting screw will cause movement of the square nut 50 longitudinally of said adjusting screw and, due to the engagement of the bifurcated arm 48 with said nut, will cause corresponding movement of the supporting plate.

The outer ends of the bifurcated sections of the arm 48 extend beyond the square nut 50 and are engaged by a pressure plate 54 having a wedge block 55 formed thereon. A wedge member 56, having a taper corresponding to the taper of the wedge block 55, is threaded onto an elongate locking screw 57, whereby the wedge 56 may be moved longitudinally of said locking screw. The surface of the wedge 56 opposite the wedge block 55 is adapted to slide along the outer vertical side wall of the recess 49, so that when the wedge is moved longitudinally on the locking screw in one direction the tapered surfaces of the wedge and wedge block will cause the plate 54 to be pressed firmly against the ends of the bifurcated sections of the arm 48 and thus frictionally hold the supporting plate 45 in any desired adjusted position. The locking screw is provided with an external annular flange 58 spaced from its head 59 and adapted to engage against the upper wall of the recess to prevent longitudinal movement of said locking screw.

It will be seen, therefore, that the locking screw 57 may be rotated to withdraw the wedge 56 from wedging engagement with the wedge block 55, whereupon the adjusting screw 51 may be rotated to cause movement of the square nut 50 longitudinally thereon and thus cause corresponding longitudinal adjustment of the supporting plate 45. When the supporting plate has been moved to the desired position, the locking screw 57 may be rotated to force the wedge 56 between the wall of the recess and the wedge block 55 to press the plate 54 against the ends of the sections of the bifurcated arm 48 to lock the supporting plate in such adjusted position.

A thin flat cover plate 60 is secured by screws 61 to the upper surface of the platform for covering the recess 49 and the mechanism contained therein. The inner edge of the cover plate also overlies the edge of the supporting plate 45 opposite the flange 47 and, with said flange, confines the supporting plate against displacement from the groove 46.

An upstanding positioning lug 65 is provided on the upper surface of the supporting plate 45 and is elongated transversely of said supporting plate. This lug is adapted to engage against one end of the characters (not shown) of a type block T for correctly positioning the type block in a manner which will be hereafter more fully explained. If desired, an insert of asbestos or similar heat resisting material 66 may be mounted in a recess on the upper surface of the supporting plate for limiting dissipation of heat from the type block as the same is soldered to the type bar B. The asbestos insert may, however, be omitted since it is not essential to the invention.

A type block clamping member 67 is adjustably secured to the cover plate 60 by means of screws 68, and has a pair of spaced contacting fingers 69 provided thereon for engaging against the side of the type block. The fingers 69 are spaced from the upper surface of the platform 35, whereby they engage the side of the type block at a point above the face thereof. A latch member 70 is pivotally mounted on the upper surface of the platform on the opposite side of the movable supporting plate 45 from the clamping fingers 69 and is disposed substantially centrally between the spaced fingers, as clearly shown in Figure 1, whereby the type block is rigidly gripped between the fingers of the clamping member and the tip of the latch member.

Furthermore, the supporting plate may be magnetized if desired, in which event the magnetic force will initially hold the type block in flat contacting position on the surface of said plate. The type block so initially held in place by such magnetic force may then be positively clamped in position on the supporting plate by the contacting fingers 69 and the latch member 70.

The latch member is connected by means of a screw 71 to the head of a pivot pin 72 which is rotatably mounted in a vertical opening 73 formed in the type supporting platform. An elongate flat spring member 74 is mounted in an elongate recess 75 formed in the underside of the platform and one arm of the spring member engages in a notch 76 formed in the lower portion of the pivot pin 72, whereby when the pin is turned the spring urges the pin to return to the position shown in Figures 1 and 3, whereby the latch member 70 is then normally urged to and held in tight block engaging position. The latch member is preferably provided with an elongate handle section 77 which is bent downwardly and backwardly upon itself, as shown in Figure 3. The backwardly turned portion of the arm is adapted to engage the upper surface of the platform when the latch member is swung to disengaged position, whereby the latch member will be frictionally retained in such disengaged position. If desired, however, the underturned portion of the handle may be omitted.

A portion of the periphery of the body 10 is cut away to provide a planar surface 80 lying in a plane extending radially inwardly through the axis of said body and parallel to the upper surface of the type supporting platform 35 and the supporting plate 45. Measurements may thus be taken between the planar surface 80 and the upper surface of the type supporting plate 45 to set the platform 35 so that the supporting plate 45 will lie in a plane which would be tangential to the platen of the machine being serviced. The distance between the planar surface 80 and the surface of the supporting plate 45 is thus set to be equal to the radius of the platen of the machine being serviced, whereby the surface of the supporting plate 45 will be positioned properly to receive the type block B in the same manner as if the type block were engaging the platen of the machine.

For resiliently and positively maintaining the type bar B, shown in dotted lines in Figure 3, in correct position in the notch or slot provided in the back of the type block T, whereby the bar may be soldered in place in such notch or slot, a pressure head 85 is provided. The pressure head is carried on the lower end of an elongate pin 86 having a finger grip 87 at its upper end and extending diametrically through one end of an adjusting sleeve 88. A spring 95 interposed between the pressure head 85 and the outer end of the sleeve 88 and surrounding the shaft 86 normally urges the pressure head downwardly into engaging position. The adjusting sleeve slidably telescopes one arm of an L-shaped supporting rod or bar 89 and is held in adjusted positions thereon by a set screw 90 threaded through the wall of the inner end of said sleeve and engaging said arm.

The other arm of the L-shaped supporting bar is slidably mounted in an upstanding socket member 91 which has its lower end portion secured in an opening in the enlarged flange portion 20 of the sleeve 15 by means of a retaining screw 92. The inner end of the retaining screw engages in an annular groove 93 formed in the reduced portion of the socket member, whereby said socket member may be rotated about its axis. A set screw 94 is screw-threaded through the wall of the socket member near its upper end for engaging and locking the supporting bar 89 at various adjusted elevated positions with respect to the socket member.

Manifestly, the socket member 91 may be rotated about its axis to swing the sleeve 88 and the pressure head carried thereby toward and from the type block supporting platform 35, whereby the pressure head may be moved to engage the type bar to hold the same in place in the notch or slot in the back of the type block and may be removed from such holding position.

In using the type gage and soldering jig, the platen and platen shaft of the typewriting machine are first removed from the carriage C. The distance between the planar surface 80 and the upper surface of the supporting plate 45 is set equal to the radius of the platen of the machine by loosening the locking screw 39 and moving the platform 35 radially to the correct position and tightening the locking screw. The elongate clamping shaft 22 is then inserted through the platen shaft bearing opening O in the carriage frame, and the clamping nut 29 is tightened to draw the outer end of the arbor 16 into engagement with the carriage frame. The conical end of the centering member 25 enters the opening O and, as it is pressed back against the force of the spring 26, guides and centers the shaft and arbor, whereby the body 10 and the associated parts are positively and rigidly supported in axial alignment with the centers of the platen shaft bearing openings.

If the diameter of the bearing opening O is considerably larger than the diameter of the shaft 22 or if the opening is slotted instead of circular, a bushing or sleeve 97, having an external diameter fitting the bearing opening O and having an internal diameter closely fitting the shaft 22, may be mounted on the shaft between the end of the arbor and the inner end of the clamping nut. This will assure correct centering and axial alignment of the device in the platen shaft bearing opening.

The carriage of the typewriter is then locked against side movement in any suitable manner, as by means of the margin stops of the machine, by means of the tabular stops, or by pressing the space bar downwardly and tying it in such depressed position whereby the escapement dog limits movement of the carriage, or in any other suitable manner. The thumb screw 15 is then loosened to permit the body 10 to be moved longitudinally with respect to the sleeve 12, whereby the type supporting plate 45 may be centered at the striking point of the type bar and type blocks. With such longitudinal adjustment effected, the thumb screw 15 is tightened to lock the body against further longitudinal movement. The thumb screw 21 in the sleeve 12 is next loosened and the body 10 is turned about its axis until the upper surface of the type supporting plate 45 is in such a position that the face of the type lies flat against the surface of the supporting plate, whereupon the thumb screw 21 is tightened to lock the body against further rotation. In normal practice, the type supporting platform 35 has already been moved radially outwardly with respect to the axis of the body 10 until the surface of the supporting plate 45 is spaced from the center of the body by a distance equal to the radius of the platen of the machine being serviced. Thus, the surface of the supporting plate 45 is so positioned that it would be tangential to the platen of the typewriter, whereby it stops the type at the same point at which such type would strike the platen in use.

Next, the type key is depressed to cause the type bar to swing the type block to printing position, where the face of the type block engages squarely against the upper surface of the supporting plate 45. The locking screw 57 is then rotated to move the wedge 56 away from the wedge block 55, whereby the adjusting screw 51 may be turned to move the supporting plate 45. The supporting plate is moved until the upstanding lug 65 engages against either the upper or lower end of the character on the face of the type block. With the supporting plate so adjusted, the locking screw 57 is again rotated to move the wedge 56 toward the wedge block 55 to move the pressure plate 54 into tight frictional anchoring engagement with the ends of the sections of the bifurcated arm 48, whereby the supporting plate is securely held in such adjusted position.

The ends of the fingers 69 of the clamping members 67 should now engage one side of the type block, but if they do not the thumb screw 15 may be loosened and the body 10 adjusted until the tips of the fingers do lightly engage the side of the block. The latch member 70 can then be moved to the engaging position shown in Figure 3 to securely clamp the type block between the latch member and the fingers 69 and in tight engagement with the upper surface of the supporting plate 45.

The old type block may then be removed from the type bar by melting the solder connecting the same together. A new type block is then placed in position on the supporting plate 45 with the corresponding end of the character on the face of the block in engagement with the lug 65 and the latch 70 is moved to clamping position to hold the block in such position. The type bar may then be swung into the notch or slot in the back of the block and the pressure head 85 swung over the type bar, as shown in Figure 3, to positively and resiliently hold said bar in position in such slot or notch. Solder may then be run into the notch to secure the bar to the type block.

After the solder has cooled and hardened sufficiently, the pressure head 85 may be swung from its holding position to permit the type bar to swing back away from printing position, and another bar and block swung into place on the supporting plate 45, whereupon the process just described may be repeated to replace the type block.

Where the type characters have upwardly or downwardly extending portions, such as have the letters h and p, the lug 65 may be moved to contact the portion of the character not so extending above or below the line of the main portion of the character, whereby the type block may be correctly secured to the type bar to maintain the character in proper alignment with the other characters. Thus, by comparison with properly aligned characters, an entire set of type blocks may be properly secured to the type bars of the typewriting machine.

Obviously, since the type blocks are all aligned by means of the ends of the characters on the face thereof engaging the upstanding lug 65, the type impressions will all be in proper alignment. Furthermore, since the surface of the supporting plate 45 was adjusted into correct tangential striking position, the type characters will strike the platen flatly to obtain a full, even impression.

To assure vertical alignment of the type block, the clamping member 67 may be adjusted to bring the tips of the fingers 69 into vertical alignment. This may be done by loosening one of the screws 68 and pivoting the clamping member about the other screw until the correct position has been obtained, whereupon the first screw may be tightened to secure the clamping member in position.

Manifestly, the type bars of a typewriting machine in which such type bars are adjustably mounted on their pivot shaft may be adjusted to align the type characters by using the type gage and soldering jig as a gage to position the type characters properly and then adjusting the connection of the type bars on the pivot shaft.

From the foregoing, it will be seen that an improved type gage and soldering jig has been provided which is adapted for use with typewriting machines of various makes, styles, sizes and types, for aligning and correctly positioning the type characters on the face of type blocks. It will particularly be noted that the type gage and soldering jig is adapted to be rigidly clamped and supported on the typewriting machine carriage in the correct position for aligning and positioning the type characters, whereby the type is fitted to the particular machine being serviced and is assured of being properly aligned and positioned for full printing impression. It will further be seen that means has been provided on the type gage and soldering jig for positively and resiliently holding the type bars in place in the notch or slot at the back of the type blocks while the blocks are being soldered to such bars, and that holding means is provided on the table or platform for positively adjusting and holding the type block in correct position for such soldering. Also, the movable table or type platform has means for positively adjusting the type supporting plate thereon in position for properly aligning the type characters and means is provided for positively setting and holding the supporting plate in such correct type aligning position. Furthermore, means has been provided for accurately setting the type supporting surface of the platform at correct platen diameter. It will particularly be noted that a type gage and soldering jig has been provided which is small and easily installed and used, and which does not require any substantial dismantling of the typewriting machine to permit replacement of used type or installation of new type blocks on the type bars of such machine.

It is particularly important to note that, since the type gage and soldering jig is secured to only one side of the carriage frame of the machine being serviced, it is readily interchangeable and usuable in machines having different carriage widths, as well as on different makes and types of machines. The sleeve or bushing 97 also permits the device to be used on various machines having platen shaft bearing openings larger than the centering member or on machines having slotted platen shaft openings rather than circular openings.

The foregoing description of the invention is explanatory only, and changes in the details of the construction illlustrated may be made by those skilled in the art, within the scope of the appended claims, without departing from the spirit of the invention.

What I claim and desire to secure by Letters Patent is:

1. A type gage and soldering jig including, an elongate cylindrical arbor having an abutment face at one end normal to its longitudinal axis, a clamping shaft carried by the arbor and projecting axially therefrom normal to the abutment face and adapted to extend through a platen shaft bearing opening in one of the supports of the platen carriage of a typewriting machine, an adjustable clamping member on the shaft disposed to rigidly clamp the abutment face of the arbor to said one platen shaft bearing support to position the arbor in axial alignment with the centers of the platen shaft bearing openings of such carriage, a body member telescoping the opposite ends of the arbor and rotatable about the axis of said arbor, a type-supporting table having a shank projecting rearwardly from the back of said table normal to the front supporting surface thereof, the body member having a transverse opening therein extending diametrically of the axis of the arbor for receiving the shank of the supporting table whereby said table is adjustable radially inwardly and outwardly with respect to the axis of the arbor, and clamping means for securing the body and table in adjusted positions.

2. A type gage and soldering jig for positioning and aligning type blocks of a typewriting machine and including, an elongate cylindrical arbor having an abutment face at one end normal to its longitudinal axis, a clamping shaft carried by the arbor and projecting axially therefrom normal to the abutment face and adapted to extend through one platen shaft bearing opening of the platen carriage of a typewriting machine, adjustable clamping means on the shaft disposed to rigidly clamp the abutment face of the arbor to said one platen shaft bearing support of the carriage to position the arbor in axial alignment with the centers of the platen shaft bearing openings of said carriage, a body member telescoping the opposite end of the arbor and rotatable about the axis of said arbor and having a transverse opening therein extending diametrically of the axis of the arbor, a type-supporting table having a shank projecting rearwardly from the back of said table normal to the front supporting surface thereof and slidable in the transverse opening of the body member whereby the supporting table is adjustable radially inwardly and outwardly with respect to the axis of the arbor, the rotatable mounting of the body member and the radial adjustment of the supporting table permitting the supporting surface of said table to be adjusted to typestriking position whereby the type blocks of the typewriting machine may be supported on the table in correct printing position, and releasable clamping means for positively holding the supporting table and body member in such adjusted position.

3. A type gage and soldering jig for positioning and aligning type blocks of a typewriting machine and including, an elongate cylindrical arbor having an abutment face at one end normal to its longitudinal axis, a clamping shaft carried by the arbor and projecting axially therefrom normal to the abutment face and adapted to extend through one platen shaft bearing opening of the platen carriage of a typewriting machine, adjustable clamping means on the shaft disposed to rigidly clamp the abutment face of the arbor to said one platen shaft bearing support of the carriage to position the arbor in axial alignment with the centers of the platen shaft bearing openings of said carriage, a body member telescoping the opposite end of the arbor and rotatable about the axis of said arbor and having a transverse opening therein extending diametrically of the axis of the arbor, a type-supporting table having a shank projecting rearwardly from the back of said table normal to the front supporting surface thereof and slidable in the transverse opening of the body member whereby the supporting table is adjustable radially inwardly and outwardly with respect to the axis of the arbor, the rotatable mounting of the body member and the radial adjustment of the supporting table permitting the supporting surface of said table to be adjusted to type-striking position whereby the type blocks of the typewriting machine may be supported on the table in correct printing position, releasable clamping means for positively holding the supporting table and body member in such adjusted position, an aligning member carried by the type-supporting table and movable thereon to engage the type characters on the face of the type locks for aligning said characters, and means on the table for releasably locking the aligning member in adjusted type-engaging position.

4. A type gage and soldering jig of the character set forth in claim 3 and including, means for holding the type block in position on the type-supporting table in engagement with the aligning member.

5. A type gage and soldering jig of the character set forth in claim 3 and including, means for releasably holding the type block in position on the type-supporting table and in engagement with the aligning member, and a clamping member swingably mounted on the arbor for holding a type bar in engagement in the notch in the back of the type block whereby the block may be secured to the type bar with the printing face of the type block in proper printing position.

6. A type gage and soldering jig of the character set forth in claim 3 and including, a centering member movable on the clamping shaft at the abutment face of the cylindrical arbor for aligning said arbor axially with the centers of the platen shaft bearing openings of the carriage of the typewriting machine.

7. A device for positioning type blocks on the type bars of a typewriting machine including, an elongate cylindrical arbor having an abutment face at one end normal to its longitudinal axis; a clamping shaft carried by the arbor and projecting axially therefrom normal to the abutment face and adapted to extend through a platen shaft bearing opening in the carriage of the typewriting machine; a clamping member adjustable on the shaft and disposed to rigidly clamp the abutment face of the arbor to one platen shaft bearing support of the carriage of the typewriting machine to position the arbor in axial alignment with the centers of the platen shaft bearing openings of such carriage; an adjusting sleeve rotatably mounted on the arbor so as to be rotatable about the axis of said arbor; a body member slidably telescoping said adjusting sleeve and arbor and adjustable longitudinally of the axis of the arbor; a type-supporting table having a shank projecting rearwardly from the back of said table normal to the front supporting surface thereof; the body member having a transverse opening therein extending diametrically of the axis of the arbor for receiving the shank of the supporting table whereby said table is adjustable radially inwardly and outwardly with respect to the axis of the arbor; the sleeve, body member and supporting table being adjustable to position the supporting surface of the table in type-striking position whereby the type blocks of the typewriting machine may be supported on said table in correct printing position; clamping means for rigidly securing the sleeve, body and table in such adjusted positions; and an aligning member carried on the supporting surface of the supporting table and movable to engage the characters on the face of the type block for aligning the same.

8. In a type gage and soldering jig of the character set forth in claim 7, means for holding the type block in position on the type supporting table in engagement with said aligning member.

9. In a type gage and soldering jig of the character set forth in claim 7, an elongate clamping arm swingably mounted on the arbor for engaging a type bar for holding the same in position for connection to a type block supported on said type supporting table.

10. In a type gage and soldering jig of the character set forth in claim 7, a measuring surface on the body parallel to the surface of the type supporting table and extending radially of the axis of the arbor and adapted to be used as a reference point for setting the surface of the type supporting table at a distance from the axis of the body equal to the radius of the platen of the typewriting machine.

11. A type gage and soldering jig including, a type supporting table having an aligning member adjustably mounted thereon and having means for securing said aligning member in adjusted positions, a shank projecting rearwardly from the back of the supporting table normal to the front supporting surface thereof, a body member for supporting said type supporting table and having a diametrical opening for receiving the shank of the supporting table whereby the type supporting table is adjustable radially inwardly and outwardly with respect to the body member, means for securing the type supporting table in radially adjusted positions with respect to the body, a sleeve telescoping the body and on which the body is movable longitudinally to adjusted positions, means for securing the body in adjusted longitudinal positions on said sleeve, an arbor telescoping said sleeve and on which said sleeve is rotatable about the axis of the arbor, means for securing said sleeve in adjusted rotated positions on said arbor, an axial shaft carried by and projecting from one end of said arbor and adapted to be inserted through a platen shaft bearing opening in the carriage of a typewriting machine, and having a clamping nut threaded thereon whereby the arbor may be rigidly clamped at only said one end to the carriage of said machine in axial alignment with the centers of the platen shaft openings in such carriage, the arbor, sleeve and body being shorter in length than the distance between the platen shaft bearing supports of the carriage of the typewriting machine whereby the type gage and soldering jig may be used in typewriting machines having different carriage widths.

12. In a type gage and soldering jig of the character set forth in claim 11, securing means carried by the type supporting platform for positively holding type blocks in position on the type supporting table in engagement with the aligning member thereon.

13. A type gage and soldering jig of the character set forth in claim 12, wherein the type securing means is adjustable to permit vertical alignment of the type block on the supporting table.

14. In a type gage and soldering jig of the character set forth in claim 11, a resilient pressure member carried by the body and movable toward and from position above the type supporting table for positively resiliently holding a type bar in position for connection to a type block supported on said type supporting table.

15. In a type gage and soldering jig of the character set forth in claim 11, a planar surface on the body parallel to the working surface of the type supporting table and extending through the axis of the body, whereby said planar surface is adapted to be used as a reference point for setting the surface of the type supporting table at a distance from the axis of the body equal to the radius of the platen of the typewriting machine.

HAROLD C. FOX.

REFERENCES CITED

The following references are of record in the file of this patent:

UNITED STATES PATENTS

| Number | Name | Date |
|---|---|---|
| 1,516,233 | Lindburg | Nov. 18, 1924 |
| 1,721,424 | Whightsil | July 16, 1929 |
| 1,890,659 | Thorell | Dec. 13, 1932 |
| 2,257,122 | O'Connor | Sept. 30, 1941 |